(12) United States Patent
Li et al.

(10) Patent No.: US 11,514,715 B2
(45) Date of Patent: Nov. 29, 2022

(54) DEEPFAKE VIDEO DETECTION SYSTEM AND METHOD

(71) Applicant: National Cheng Kung University, Tainan (TW)

(72) Inventors: Jung-Shian Li, Tainan (TW); I-Hsien Liu, Tainan (TW); Chuan-Kang Liu, Tainan (TW); Po-Yi Wu, Tainan (TW); Yen-Chu Peng, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 75 days.

(21) Appl. No.: 17/325,511

(22) Filed: May 20, 2021

(65) Prior Publication Data
US 2022/0129664 A1    Apr. 28, 2022

(30) Foreign Application Priority Data
Oct. 27, 2020   (TW) .................................. 109137318

(51) Int. Cl.
*G06V 40/16* (2022.01)
*G06N 3/08* (2006.01)
*G06V 20/40* (2022.01)
*G06V 40/40* (2022.01)
*G06V 40/18* (2022.01)

(52) U.S. Cl.
CPC ........... *G06V 40/171* (2022.01); *G06N 3/084* (2013.01); *G06V 20/46* (2022.01); *G06V 40/172* (2022.01); *G06V 40/193* (2022.01); *G06V 40/40* (2022.01)

(58) Field of Classification Search
CPC ...... G06V 10/454; G06V 10/82; G06V 20/46; G06V 40/171; G06V 40/172; G06V 40/193; G06V 40/40
See application file for complete search history.

(56) References Cited

U.S. PATENT DOCUMENTS

| | | |
|---|---|---|
| 2020/0065526 A1 | 2/2020 | Berman |
| 2020/0327410 A1 | 10/2020 | Fairhart |
| 2021/0209388 A1* | 7/2021 | Ciftci ................... G06V 10/764 |
| 2022/0187847 A1* | 6/2022 | Celia .................. G05B 19/4155 |

FOREIGN PATENT DOCUMENTS

CN    111860414 A    10/2020

\* cited by examiner

*Primary Examiner* — Ruiping Li
(74) *Attorney, Agent, or Firm* — Locke Lord LLP; Tim Tingkang Xia, Esq.

(57) ABSTRACT

A deepfake video detection system, including an input data detection module of a video recognition unit for setting a target video; a data pre-processing unit for detecting eye features from the face in the target video; a feature extraction module for extracting eye features and inputting the eye features to a long-term recurrent convolutional neural network (LRCN); and then using a sequence of long-term and short-term memory (LSTM) of a learning module; performing sequence learning; using a state prediction module to predict the output of each neuron, and then using a long and short-term memory model to output the quantized eye state, then connecting to a state quantification module, and comparing the original stored data from the normal video and the quantified eye state information of the target video, and outputting the recognition result by an output data recognition module.

9 Claims, 4 Drawing Sheets

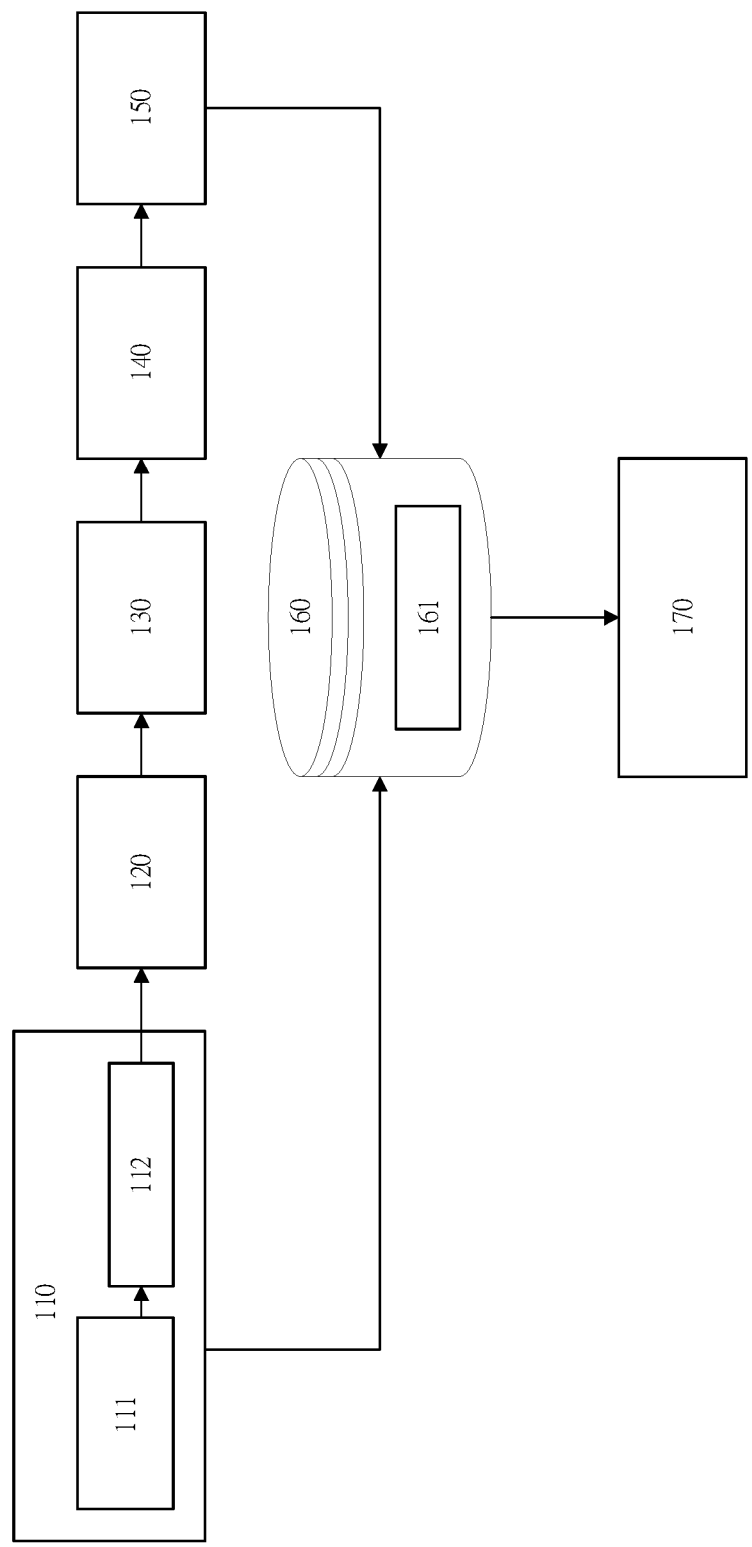
[Fig.1]

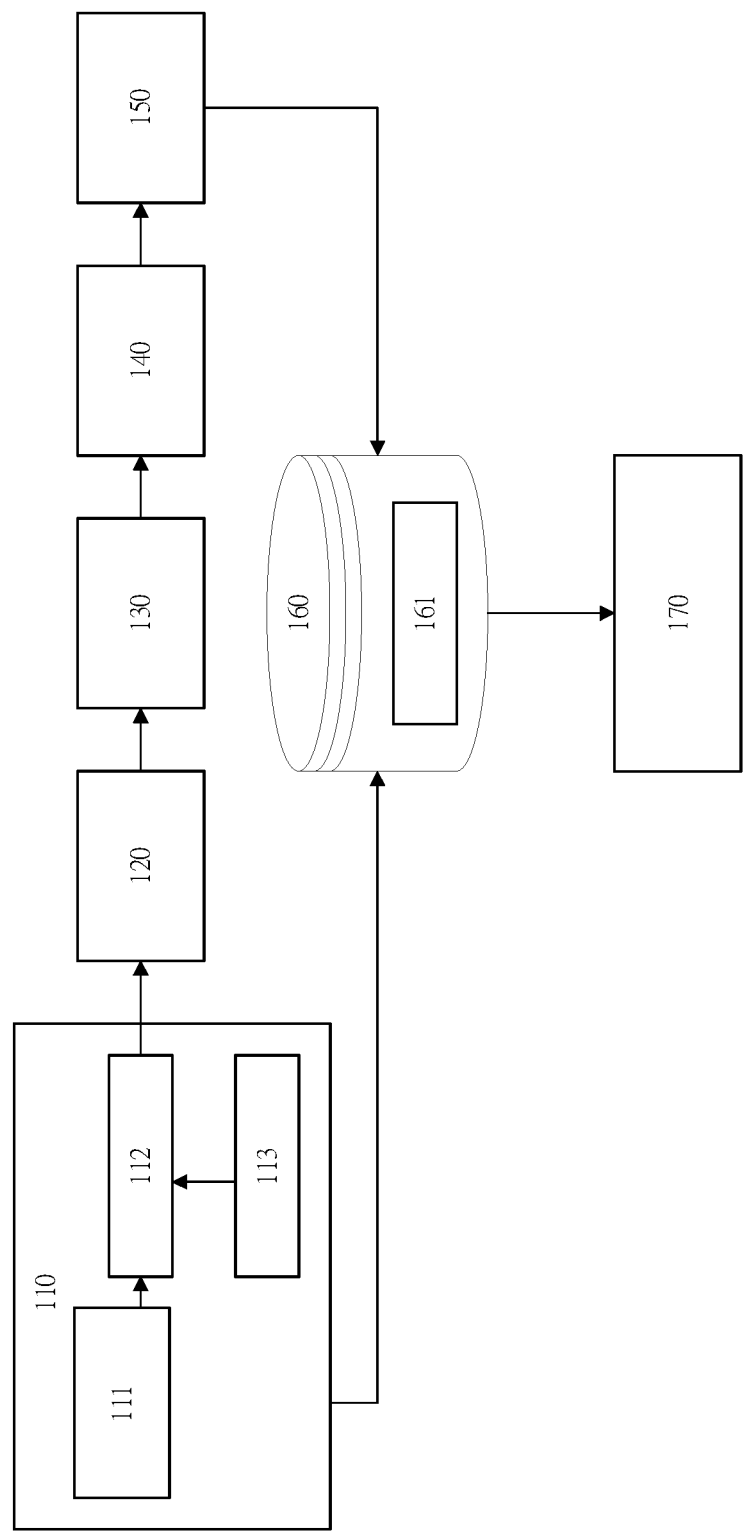
[Fig.2]

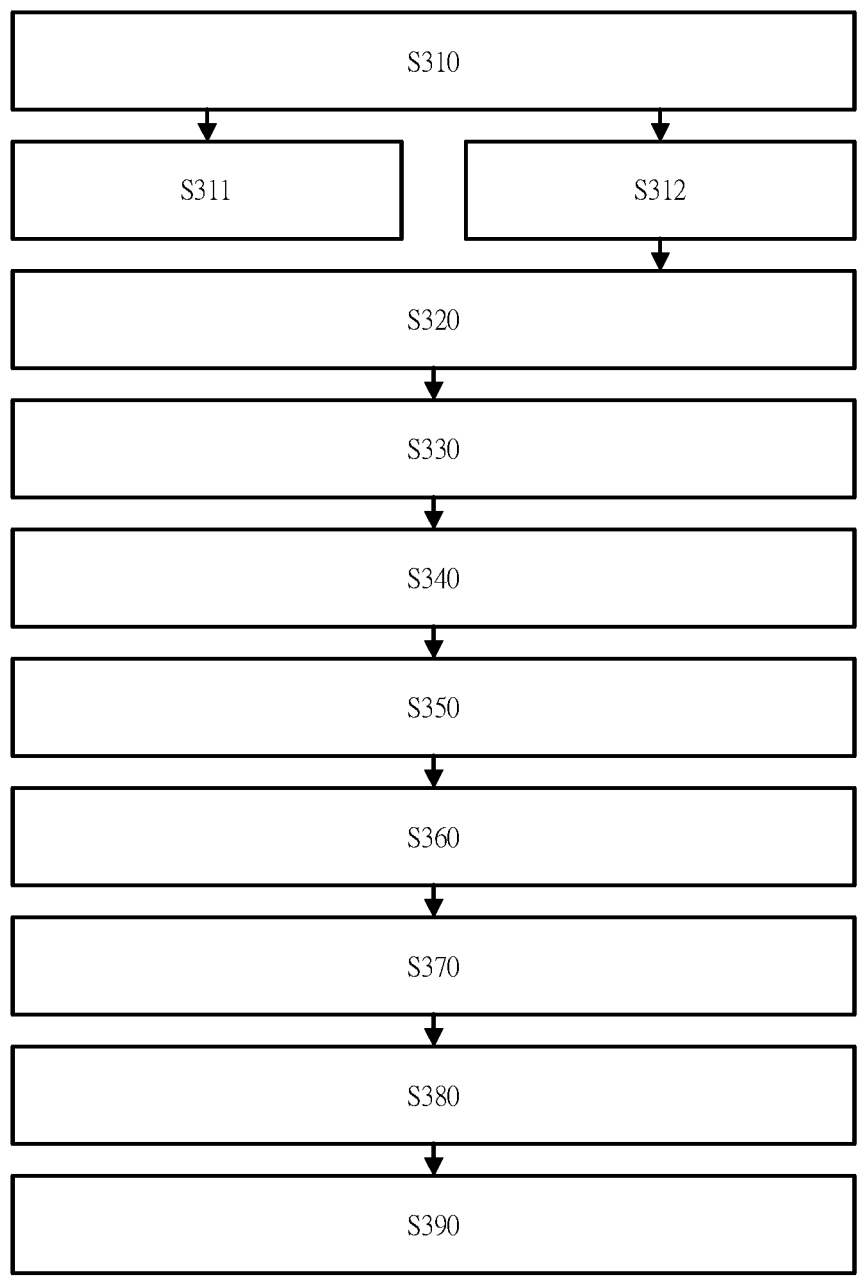
【Fig.3】

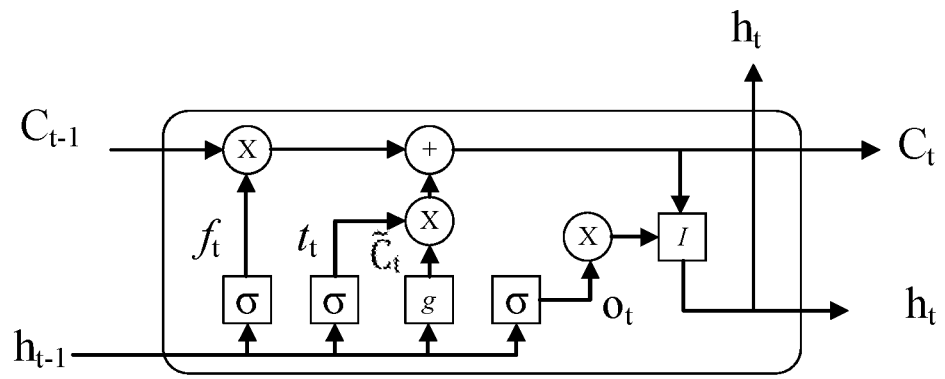
【Fig.4】
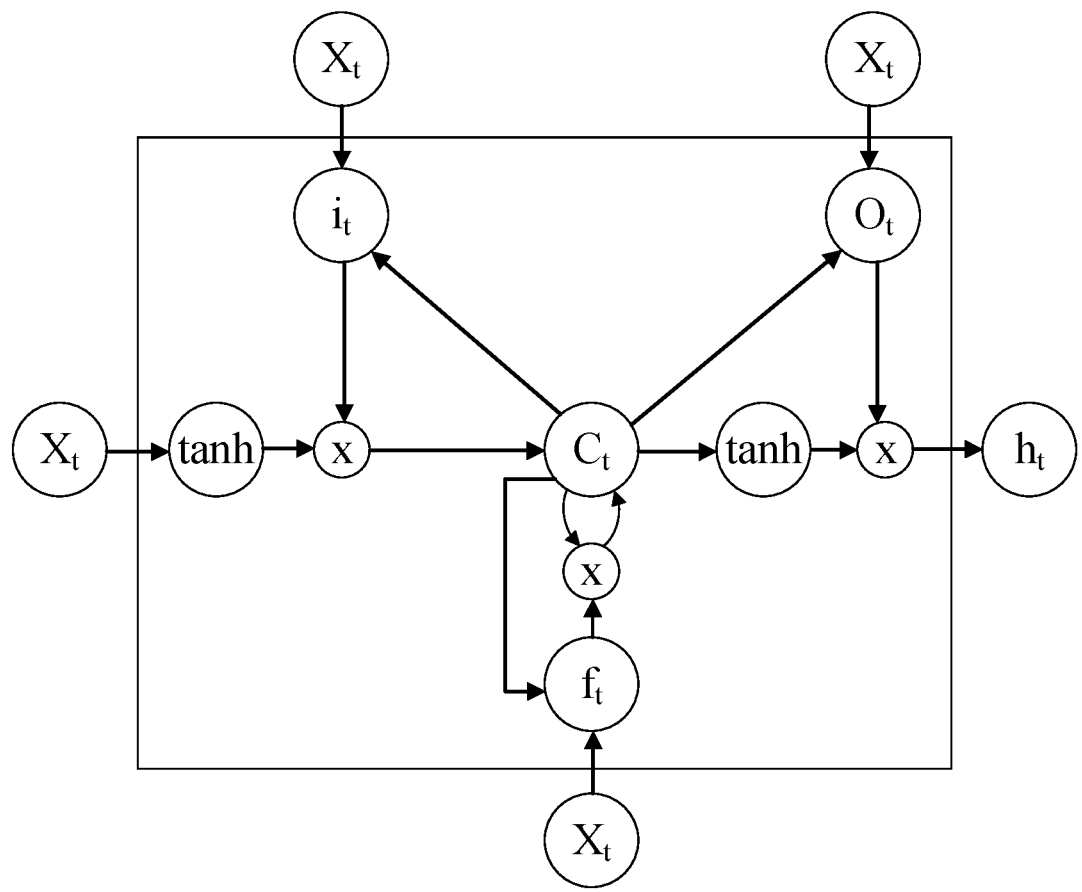
【Fig.5】

DEEPFAKE VIDEO DETECTION SYSTEM AND METHOD

CROSS REFERENCE TO RELATED APPLICATION

This application claims the benefits of Taiwan application Serial No. 109137318 filed on Oct. 27, 2020, the disclosures of which are incorporated by references herein in its entirety.

BACKGROUND OF THE INVENTION

1. Field of the Invention

The present disclosure relates to facial recognition, and in particular to a system and method of detecting changes in the state of human eyes in a video, quantifying the behavior of the eye features based on time using deep learning, and then integrating statistical models to determine whether the video has been faked or altered.

2. Description of the Related Art

Recently, due to the advancement of hardware computing capabilities and distributed computing, machine learning and deep learning have rapidly developed and continues to be applied in numerous fields. Among them, in the field of deepfakes, there have been considerable breakthroughs in a short period of time. As a result, the cost and technology required for creating deepfakes have also been continuously reduced thereby causing the Internet to be full of fake or fraudulent videos. Incorrect or processed video content has become quite common and the deep learning network has created a very powerful technology that not only has the ability to manipulate, and even create visual and auditory content with a high degree of accurate simulation. This affects the success rate of artificial judgments of the authenticity of the media. As deepfake videos are used for fraudulent smearing, retaliatory acts, and criminal actions using famous or powerful people such as celebrities, politicians, and other well-know people, the use of deepfakes has been identified and gradually restricted, and such problems have gradually attracted attention.

With the rapid development of deep learning, big data analysis and image recognition technologies are also widely used in different fields. At the same time, the ability of deepfake forgeries and counterfeiting is becoming more and more realistic. The impact caused by this situation is extensive. Not only will the abuse of this forgery technology to generate unrecognizable false content which will cause immeasurable harm, verification of the authenticity of the content is also an important subject, and the moral issues, privacy issues, and even potential national security threats cannot be ignored.

The impact of deepfake media in the current social engineering environment has become more and more intense. Whether it is to expose the fake content or to prove the authenticity of the real content, this network environment with mixed virtual and real content has become extremely challenging. Disputes in the process often involve privacy and ethics issues, and even lead to issues such as information security. Therefore, how to avoid harm is a test not only of the timeliness of detection, but also its accuracy.

Currently, the detection methods related to deepfake videos can be subdivided into two types: static image detection and dynamic image detection, which are mainly improved from the past forged image recognition methods, which can be divided into several frames from the video, or by capturing a large number of pictures for detection, but this method will face strong degradation problems caused by video compression, and the time continuity of the video will make each frame continue to change. As a result, whether using static images or moving images, it is difficult for the conventional image detection method to detect the flaws between frames.

It can be seen that there are still many deficiencies in the above-mentioned conventional methods, which are not well designed and need to be improved.

BRIEF SUMMARY OF THE INVENTION

In view of this, an objective of the present invention is to improve the recognition by manual or computer programs that were used in the past. It is impossible to approach 100% recognition accuracy of the authenticity without using more sophisticated recognition methods. In this way, the present invention will continue to consider the current face recognition data set based on related data sets, face-changing software and detection methods. Both static and dynamic images are almost always in a positive eye-open state, and lack of the features of a closed eye state will lead to flaws in the processing of eye state changes. Therefore, it is important to detect the features of the eye states in the video in order to detect the deepfake video, and use the long-term and short-term memory model to use long-term recursive scrolling. The structure of the product neural network is used to quantify the changes in the eye state based on the time sequence, and finally the characteristics provided by the data set are evaluated to improve and achieve a recognition accuracy and efficiency approaching 100%.

A deepfake video detection system includes an input data detection module to receive the video to be inspected and perform integration processing. A video identification unit is used to identify whether or not the video is a suspected fake video. If a fake video is suspected, set the video as the target video. A data pre-processing unit is connected with the video recognition unit to detect the human face in the target video and locate the target video's face area of each frame in the video. The facial area is set with multiple positioning points, and the eye area is cut to form an eye feature model. A feature extraction module is connected to the input data detection model to extract a plurality of the positioning points and the eye feature models in the target video. The eye feature model is input into a long recurrent convolutional neural-networks (LRCN). A sequence learning module is connected to the feature extraction module, and the eye feature model, after the long recursive convolutional neural network, is input into the regional sequence and a long short-term memory (LSTM) for sequence learning is performed. A state prediction module is connected to the sequence learning module, and after completing the long- and short-term memory learning, it predicts the eye state of the target video to obtain the complex number neuron of a recurrent neural network, and the output of each neuron is sent to a neural network composed of a fully connected layer. A state quantification module is connected to the state prediction module and outputs the quantized eye state using a long and short-term memory model. The quantized eye state is output as a numerical value. A database module is connected to the state quantization module to store the normal video detected by the input data detection module and the quantified eye state information of the target video. A long and short-term memory module stores the eye feature model of the pre-processing unit and the quantified eye state output from the long and short-term memory model. An output data identification module is connected with the database module to output the identification result of the target video.

The deepfake video detection system comprises further processing, wherein the eye feature model is used to generate a rectangular shape surrounding the human eye after enlarging the human eye horizontally and vertically by 1.5 times, in order to ensure that the cropped area includes the complete human eye, and the changes around the eye are also used as a feature of the crop.

In one embodiment of the present invention, the sequence learning is achieved through a recurrent neural network with the long and short-term memory model, so as to increase the memory storage capacity of the long-term recursive convolutional neural network to avoid training back propagation that occurs when the weight is updated in the stage causes the gradient to disappear.

In an embodiment of the present invention, the data pre-processing unit is capable of inputting each frame of a static image or a dynamic image for extraction.

In one embodiment of the present invention, the input data detection module may further include a facial features recognition unit, which locates and recognizes facial features individually when performing facial detection. Each frame of the face area in the target video is distinguished by the five sense organs, so that the surrounding features have their own characteristic models.

In one embodiment of the present invention, the long and short-term memory model is a model building for the input time series data.

The present invention further comprises a method for detecting deepfake videos, the steps comprising:

Step 1. Importing a video to be detected into an input data detection module, and identifying whether the video is a suspected fake video by a video recognition unit set in the input data detection module;

Step 2. If it is not, it is judged as a normal video, and it is directly sent to a database module for data storage, and becomes comparison data;

Step 3. If yes, the video is judged as a fake video and set as a target video at the same time;

Step 4. Using a data pre-processing unit to detect the face of the person in the target video, and locating the face area of each frame in the target video, and setting the face area to a plural number of anchor points;

Step 5. Using the plurality of positioning points around the eye to cut the eye part to be targeted in order to form an eye feature model;

Step 6. Using a feature extraction module to extract a plurality of positioning points and the eye feature model in the target video, and input the eye feature model to a long-term recursive convolutional neural network (LRCN);

Step 7. Using a sequence learning module to input the eye feature model after the long-term recurrent convolutional neural network into the regional sequence, and using a long short-term memory (LSTM) for sequence learning;

Step 8. After completing the learning of the long and short-term memory, using a state prediction module to predict the eye state of the target video in order to obtain a plurality of neurons of the recurrent neural network, and outputting the output of each neuron and send to a neural network composed of fully connected layers;

Step 9. A state quantification module outputs the quantized eye state using a long short-term memory model, and outputs the quantized eye state as a value;

Step 10. Storing the quantified eye state output from the long-term and short-term memory model to a long-term and short-term memory unit set in the database module; and Step 11. Finally, an output data identification module is used to output whether or not the identification result of the target video confirms it is a fake video.

In one embodiment of the present invention, the data pre-processing unit performs face detection, so that each frame of the static image or the dynamic image can be input for extraction.

In one embodiment of the present invention, Step 4 above performs facial features recognition and positioning with a facial features recognition unit before the data preprocessing unit is executed, and then locates the facial features in the target video for each frame in the face area to distinguish the five sense organs, so that each of the five sense organs has its own characteristic model.

BRIEF DESCRIPTION OF THE DRAWINGS

FIG. 1 is a system schematic diagram of the deepfake video detection system and method of the present invention.

FIG. 2 is a schematic diagram of another system of the deepfake video detection system and method of the present invention.

FIG. 3 is a flow chart of the system and method for detecting deepfake videos of the present invention.

FIG. 4 is an architecture diagram of the long and short-term memory model of the deepfake video detection system and method of the present invention.

FIG. 5 is a flow chart of the long short-term memory model operation of the deepfake video detection system and method of the present invention.

DETAILED DESCRIPTION OF THE INVENTION

In order to help understand the technical features, content and advantages of the present invention and the effects that can be achieved, the present invention is described in detail in the form of embodiments with accompanying drawings as follows, and the figures used therein. The main purpose of the formulas is only for illustrative and auxiliary manual purposes, and may not be the true proportions and precise configuration after the implementation of the present invention. Therefore, it should not be interpreted in terms of the proportions and configuration relationships of the attached drawings, and should not limit the actual implementation of the present invention. The scope of rights shall be stated first.

Please refer to FIGS. 1 and 2, which are system diagrams of the deepfake video detection system and method of the present invention, including an input data for receiving a video to be detected and integrated processing. The detection module (110) includes a video recognition unit (111) for recognizing whether or not the video is a suspected fake video, and sets the suspicious fake video as the target video. Connected with the video recognition unit (111), a data pre-processing unit (112) is provided to detect the human face in the target movie, locate the face area of each frame in the target movie, and set the face area with a plurality of positioning points that are cut around the eyes to form an eye feature model, where the eye feature model is a horizontal and vertical 1.5 times magnification around the human eye to generate one that surrounds the human eye. A rectangular shape is used to ensure that the cropped area includes the complete human eye. At the same time, the changes around the eyes are used as features of the crop. At the same time, it can also be able to recognize the facial features individually when performing face detection. The five senses recognition unit (113) is provided for positioning and is capable of distinguishing the five senses in each frame of the face area in the target video, so that the surrounding five senses have their own characteristic models. Connected to the input data detection module (110), a feature extraction module (120) is used to extract a plurality of positioning points and the eye feature model in the target video, and input the eye feature model to a long-term recursive convolutional neural network (LRCN). A sequence learning module (130), connected to the feature extraction module (120), is provided which inputs the eye feature model after the long-term recurrent convolutional neural network into regional sequence, and a long short-term memory (LSTM) for sequence learning, where the sequence learning is through the recurrent neural network with the long-short-term memory model to increase the long-term recursive convolutional neural memory storage capacity of the network in order to avoid back propagation that occurs when the weights are updated in the training phase and causes the gradient to disappear. A state prediction module (140), connected to the sequence learning module (130), is used to complete the after learning the long-term and short-term memory, predict the eye state of the target video to obtain a plurality of neurons of the recurrent neural network, and send the output of each neuron to a fully connected layer network. A state quantification module (150), connected to the state prediction module (140), outputs the quantified eye state using a long and short-term memory model, and the quantized eye state is converted to a numerical output and model building for the input time series data. A database module (160), connected to the state quantification module (150), is used to store the input data detection module (110) detected normal video and for storing the quantified eye state information of the target video, which also includes storing the data pre-processing unit (112) eye feature model and the long-term short-term memory model and outputting the quantized long-term eye state by the short-term memory unit (161) which can input each frame of a static image or a dynamic image for extraction. An output data identification module (170), connected to the database module (160), is used to output the identification result of the target video.

Furthermore, please refer to FIG. 3, which is a flowchart of the deepfake video detection system and method of the present invention, which includes:
Step 1. (S310) Import a video to be detected into an input data detection module, and identify whether the video is a suspected fake video by a video recognition unit provided in the input data detection module;
Step 2. (S311) If it is no, it is judged as a normal video, and it is directly sent to a database module for data storage, and becomes comparison data;
Step 3. (S312) If yes, determine it as a fake video and set it as a target video at the same time;
Step 4. (S320) Perform face detection with a data pre-processing unit for the human face appearing in the target video, and locate the face area of each frame in the target video, and then compare the face multiple positioning points that are set in the area;
Step 5. (S330) Use the plurality of positioning points around the eye to cut the eye part to be targeted, to form an eye feature model;
Step 6. (S340) Use a feature extraction module to extract a plurality of positioning points and the eye feature model in the target video, and input the eye feature model to a long-term recursive convolutional neural network (LRCN);
Step 7. (S350) Use a sequence learning module to input the eye feature model after the long-term recursive convolutional neural network into the regional sequence, and use a long short-term memory (LSTM) to carry out sequence learning;
Step 8. (S360) After completing the learning of the long and short-term memory, use a state prediction module to predict the eye state of the target video to obtain a plurality of neurons of the recursive neural network, and compare each of the neurons. The output of the element is sent to a neural network composed of fully connected layers;
Step 9. (S370) A state quantification module outputs the quantized eye state using a long short-term memory model, and outputs the quantized eye state as a value;
Step 10. (S380) Store the quantified eye state output from the long and short-term memory model to a long and short-term memory unit set in the database module;
Step 11. (S390) Finally, an output data identification module is used to output whether the identification result of the target video indicates it is a fake video.

The data pre-processing unit performs face detection by inputting each frame in a static image or a moving image for extraction, and Step 4 can also be performed before the data pre-processing unit is executed. The official recognition unit recognizes and locates the five senses of the face, and distinguishes the five senses in each frame of the face area in the target video, so that the five senses have their own characteristic models around the five senses.

In other words, based on the above, the embodiments and descriptions are as follows:

When a video to be detected can be imported into an input data detection module, a video recognition unit set in the input data detection module will identify and determine whether or not the video is a suspected fake video. Set the fake video of as a target video, and use a data pre-processing unit to detect the face of the human face in the target video, and locate the face area of each frame in the target video, and set a plurality of positioning points on the face area, and use the plurality of positioning points around the eyes for the eye part to be targeted to form an eye feature model, in which the human face detection, using a face detector to locate the face area of each frame in the target video, and then extract positioning points from these detected face areas, and these positioning points include the facial features and the entire frame, the contour of the face, and use this as a reference to more accurately lock the eye information.

The coordinate-based face alignment algorithm adopted in this case aligns the face area to a uniform coordinate space. Specifically, a set of face coordinate spaces is defined first, and after the first step of face detection, first determine the reference coordinate space and the intensity of eye cropping, then align the two-dimensional face and transform it to another coordinate space, and align it completely into the coordinate space. After the conversion of all frames, each frame of the face in the image will be scaled to approximately the same size and fixed at the center of the entire image. The eyes will also be rotated and adjusted to maintain a horizontal line, which is convenient for the subsequent eye scan analysis. It is possible to avoid phenomenon that if the target person's head moves, the face orientation changes, obstacles appear in front or the screen moves, etc., phenomenon that will confuse the target video and lead to errors in face positioning analysis.

Or you can use Spatial Transformer Networks (STN) based on affine transformation to predict alignment parameters based on the input image, and then learn to scale specific parts of the face area from it, and this method is also used to minimize the possible impact of the loss function.

Furthermore, eye cropping is also the final step of data pre-processing. The aligned face area from these frames should follow the time sequence, and the horizontal and vertical areas around the human eyes that have been positioned on the horizontal line should be 1.5 times horizontally and vertically respectively. After zooming in to generate a rectangle, the cropped human eye region sequence will be passed to the next long-term recurrent convolutional network (LRCN) to predict the state of the human eye. In addition to this, ensure that the cropped area must include the complete human eye, and the changes around the corner of the eye will also be used as the extracted features to help the model training.

The convolutional neural network described in this case is a long-term recursive convolutional neural network (LRCN) that is trained end-to-end and combined with recursive network recursion, and because the change of the eye state is a high degree of processing for continuity, so the long-term recursive convolutional neural network combines the time series between consecutive frames to remember long-term dynamic changes to compensate for the impact of unrecognizable features from a single image. The long-term recurrent convolutional neural network has excellent performance in behavior recognition, and then a sequence learning module is used to input the eye feature model identified by the long-term recurrent convolutional neural network into the regional sequence, and a long short-term memory (LSTM) performs sequential learning, and after completing the learning of the long and short-term memory, a state prediction module is used to predict the eye state of the target video to obtain a plurality of recursions neurons of the neural network, and send the output of each neuron to a neural network composed of a fully connected layer, and then a state quantification module outputs the quantified eye state using a long and short-term memory model, and the quantified eye state is output as a numerical value. The purpose of the long-term and short-term memory model is to model the input time series data. Please refer to FIG. 4 and FIG. 5 at the same time, which show the depth of the present invention. The long-term and short-term memory model architecture diagram and operation flow chart of the deep-fake video detection system and its method. The structure is divided into an input valve, a forget valve, an output valve, and a memory temporary storage unit to save past information and process long-term sequences. The equation of the input valve is as follows: equation 4-1:

$$i_t = \sigma(W_{xi}x_t + W_{hi}h_{t-1} + W_{ci}c_{t-1} + b_i) \quad \text{Equation 4-1}$$

The equation of the forget valve is as shown in Equation 4-2:

$$f_t = \sigma(W_{xf}x_t + W_{hf}h_{t-1} + W_{cf}c_{t-1} + b_f) \quad \text{Equation 4-2}$$

The equation of the output valve is as shown in Equation 4-3:

$$o_t = \sigma(W_{xo}x_t + W_{ho}h_{t-1} + W_{co}c_t + b_o) \quad \text{Equation 4-3}$$

The equation of the memory temporary storage unit is as shown in Equation 4-4:

$$c_t = f_t c_{t-1} + i^t \tan h(W_{xc}x_t + W_{hc}h_{t-1} + b_c) \quad \text{Equation 4-4}$$

First, given an input sequence x=(x1 . . . xT), a standard recurrent neural network will go through the following equations 4-5 and 4-6:

$$h_t = H(W_{ih}x_t + W_{hh}h_{t-1} + b_h) \quad \text{Equation 4-5}$$

$$y_t = W_{ho}h_t + b_o \quad \text{Equation 4-6}$$

Repeatedly calculate the hidden vector sequence h=(h1 . . . hT) from t=1 to t=T, and output the vector sequence y=(y1 . . . yT), the W in the formula represents the weight matrix, the subscripts i, h, and o represent the input layer, the hidden layer and the output layer, respectively, b represents the deviation vector, and H is the activation function of the hidden layer, which is generally used in recurrent neural networks. It is a Sigmoid function. For input data whose characteristics of eye state changes are highly time-dependent, the long and short-term memory model can effectively learn the human eye characteristics of each time series, and better discover the relationship between key features and long-term time. These characteristics are based on the fact that when they want to choose whether to put the current ct into the memory temporary storage, it will be judged by the value of the hyperbolic tangent (tan h) excitation function. The value of the excitation function will be determined according to the parameters. Repetitive calculation optimization to learn, if the value is less than a specific number, the forget valve will be closed and return to 0, if it is greater than the specific number, the forget valve will be opened to put ct into the temporary memory. Please refer to FIG. 5. As shown, the input vector xt and the output of the previous hidden layer ht−1 will be sequentially input to each valve in the long-term short-term memory model, and then the input valve, the forget valve, the current memory temporary storage, and the previous time unit output the memory temporary storage ct−1, to jointly determine the output value of the new memory temporary storage ct, the output of the hidden layer ht depends on the output of the output valve and the ct after the activation function. However, the activation function of the hidden layer equation is as follows equation 4-7:

$$h_t = o_t \tan h(c_t) \quad \text{Equation 4-7}$$

The σ in the formula is the Sigmoid function.

Since the biggest change in eye condition is blinking, and blinking has a strong time dependence, so for the process of a blink, it is necessary to capture the subtle changes over time in the eyelids, corners of the eyes, and eyelashes, and these features are input to the subsequent neural network for learning, so each frame passes through the original convolutional neural network, and the long-term and short-term memory model is added by the long-term recursive convolutional neural network to train the network to learn the information of eye movement in the video. The long-term recurrent convolutional neural network is divided into three stages, which are the feature extraction stage, the sequence learning stage, and the eye state prediction stage. In the feature extraction stage, the input eye area will be converted into recognizable human eye features by the feature extraction module. These features are learned by the convolutional neural network after the VGG16-based architecture changes. After the convolutional neural network, the output of the feature extraction stage will be input to in sequence learning, the next sequence learning stage begins. The sequence learning is completed by a recurrent neural network with long-term short-term memory units, mainly to increase the memory storage capacity of the recurrent neural network model, and to deal with the recurrent neural network model. In the training phase, the back propagation that occurs when the weights are updated in the training phase causes problems with the disappearance of the gradient.

Therefore, in the final stage of eye state prediction, the output of each recurrent neural network neuron will be sent to a neural network composed of a fully connected layer.

This layer uses a long and short-term memory model and the output is quantified. The value of the eye state is presented by the quantified eye state value. If the time point is judged to be closed, the output will be 1, otherwise it will be 0. The changes in the eyelids, eyeballs and whites of the eyes are the most direct factors affecting the output results. There are still many details that are difficult for the human eye to recognize, which makes the changes in the eyes in the video quite unnatural, and the characteristic information released by these abnormalities mainly becomes the vulnerability of the deepfake of the video, which is the key to the learning of the deep neural network in this case feature.

In summary, each frame in the input video is input into the convolutional neural network in the form of a sequence, and then the output of the convolutional neural network is used as the input of the long and short-term memory model, and the output of the long and short-term memory as the output of the final network, the parameters of the convolutional neural network and the long and short-term memory model are common at the same time in the process. In the same way, in order to detect the state of the eyes, input a series of human eye regions cut out by data pre-processing, and then arrange the frame fragments in chronological order to obtain a fixed-length feature vector through feature conversion, and then input it into the sequence in the model, the long and short-term memory model is combined to map the input and the hidden layer of the previous time unit as the output, and update the state of the current hidden layer. The long-term recursive convolutional neural network is based on the long and short-term memory model. Before predicting the output result at each time point, it is necessary to wait for the prediction of the previous time point to be completed before the next prediction, that is to say, the next prediction depends on the previous prediction as an input, and then the long short-term memory model is output by the long-term and short-term memory model. The quantified eye state is stored in a long-term and short-term memory unit set in the database module, and finally an output data identification module is used to output whether or not the identification result of the target video indicates it is a fake video.

It can be seen that in the data set of face recognition, almost all static images are pictures with open eyes from the front, and in dynamic images, the analysis of the number of frames will also reveal that the proportion of the closed eyes is still lacking. Therefore, it is proposed to detect the changes of the eye state in the video to detect the deepfake video, combined with the long-term short-term memory model and use the architecture of long-term recursive convolutional neural network to realize the time-based eye state change quantification can effectively improve the accuracy and precision of the method for detecting deepfake videos.

As can be seen from the above implementation description, compared with the prior art and products, the present invention has the following advantages:

1. The deepfake video detection system and method of the present invention, in addition to the feature information of eye state changes as the target, can also hide the frame of the input video by grasping the advantage of time continuity of the video. A large number of key features are utilized, in order to follow the time series for classification and generalization, so as to simplify the detection process and speed.

2. The deepfake video detection system and method of the present invention can effectively save 10-20% of training time and improve the management of tensors to process tensors through the architecture and detection methods of the present invention.

3. The deepfake video detection system and method of the present invention can be detected in static images, can capture the local information of each image, and then use a comprehensive decision-making method to reduce the misjudgment rate, and in dynamic images, when detecting, it can learn the information of the time series dimension, and can be used for model training.

The above are only the best specific embodiments of the present invention, but the structural features of the present invention are not limited thereto. Anyone familiar with the art in the field of the present invention can easily think of changes or modifications, all of which can be covered in the following patent scope of this case.

In summary, the present invention does have an unprecedented innovative structure. It has not been seen in any publications, and there has not been any similar product on the market, so its novelty should undoubtedly be considered. In addition, the unique features and functions of the present invention are far from comparable with conventional ones, so it is indeed more progressive than conventional ones, and it complies with the requirements of patent law concerning the requirements for application of invention patents, and a patent application is filed in accordance with the law.

What is claimed is:

1. A deepfake video detection system, including:
an input data detection module (110) used to receive video data to be detected and perform integration processing, including:
   a video identification unit (111) for identifying whether or not the video data is a suspected deepfake video, and setting the identified deepfake video as a target video; and
   a data pre-processing unit (112) is connected to the video recognition unit (111) for detecting a human face in the target video and locate a face area in each frame in the target video, and setting a plurality of positioning points on the face area, and cropping around the eyes to form an eye feature model;
a feature extraction module (120) is connected to the input data detection module (110) to capture the plurality of positioning points and the eye feature model in the target video, and input the eye feature model to a long-term recurrent convolutional neural network (LRCN);
a sequence learning module (130) is connected to the feature extraction module (120), and inputs the eye feature model after the long-term recursive convolutional neural network into a regional sequence, and uses a long and short-term memory (LSTM) for sequence learning;
a state prediction module (140) is connected to the sequence learning module (130), and after completing the sequence learning of the long and short-term memory, predicts eye state of the target video to obtain a plurality of recursions neurons of the neural network, and send the output of each neuron to a neural network composed of fully connected layers;
a state quantification module (150) is connected to the state prediction module (140) to output quantized eye state using a long short-term memory model, and output the quantized eye state as a numerical value;
a database module (160) is connected with the state quantification module (150) to store normal video data detected by the input data detection module (110) and the quantized eye of the target video status information, which also includes:

a long and short-term memory unit (161) is used to store the eye feature model of the data pre-processing unit (112) and the quantified eye state output from the long and short-term memory model; and an output data identification module (170) is connected with the database module (160) to output the identification result of the target video.

2. The deepfake video detection system as described in claim 1, wherein the eye feature model generates a rectangle around the human eye after enlarging the human eye horizontally and vertically by 1.5 times to ensure that the cropped area includes the complete human eye, and at the same time, the changes around the eye are taken as a feature of the cropped area.

3. The deepfake video detection system as described in claim 1, wherein the sequence learning is through a recurrent neural network with the long and short-term memory model in order to increase the memory of the long-term recursive convolutional neural network storage capacity to avoid gradient disappearance caused by back-propagation when updating weights in the training phase.

4. The deepfake video detection system as described in claim 1, wherein the data pre-processing unit (112) can input each frame of a static image or a dynamic image for extraction.

5. The deepfake video detection system as described in claim 1, wherein the input data detection module (110) further includes a facial features recognition unit (113), which is used for face detection and facial features are identified and located individually, and the facial features are distinguished in each frame of the face area in the target video, so that the features around the facial features have their own models.

6. The deepfake video detection system as described in claim 1, wherein the long and short-term memory model is model building for the input time series data.

7. A deepfake video detection method, including:
step 1: (S310) importing a video to be detected into an input data detection module, and identifying whether or not the video is a suspected deepfake video by a video recognition unit provided in the input data detection module;
step 2: (S311) if it is no, it is judged as a normal video, and it is directly sent to a database module for data storage, and becomes comparison data;
step 3: (S312) if yes, determine it is potentially a deepfake video and set it as a target video at the same time;
step 4: (S320) performing face detection with a data pre-processing unit for the human face appearing in the target video, and locate the face area of each frame in the target video, and then compare the plurality of positioning points that are set in the face area;
step 5: (S330) using the plurality of positioning points around the eye to crop the eye part to be targeted to form an eye feature model;
step 6: (S340) using a feature extraction module to extract the plurality of the positioning points and the eye feature model in the target video, and input the eye feature model to a long-term recursive convolutional neural network (LRCN);
step 7: (S350) using a sequence learning module to input the eye feature model after the long-term recursive convolutional neural network into a regional sequence, and use a long short-term memory (LSTM) to carry out sequence learning;
step 8: (S360) after completing the learning of the long and short-term memory, use a state prediction module to predict the eye state of the target video to obtain a plurality of neurons of the recursive neural network, and compare each of the neurons of the output of the element is sent to a neural network composed of fully connected layers;
step 9: (S370) a state quantification module outputs the quantized eye state using a long short-term memory model, and outputs the quantized eye state as a numerical value;
step 10: (S380) storing the quantified eye state output from the long and short-term memory model to a long and short-term memory unit set in the database module; and
step 11: (S390) finally, an output data identification module is used to output whether the identification result of the target video indicates the target video is a deepfake video.

8. The deepfake video detection method as described in claim 7, wherein the data pre-processing unit performs face detection and can input each frame in a static image or a dynamic image for extraction.

9. The deepfake video detection method as described in claim 7, wherein step 4 is to perform facial and facial features recognition and positioning with a facial features recognition unit before the data pre-processing unit is executed and distinguish the five sense organs in each frame of the face area in the target video, so that the features around the five sense organs have their own characteristic models.

* * * * *